Figure 1:
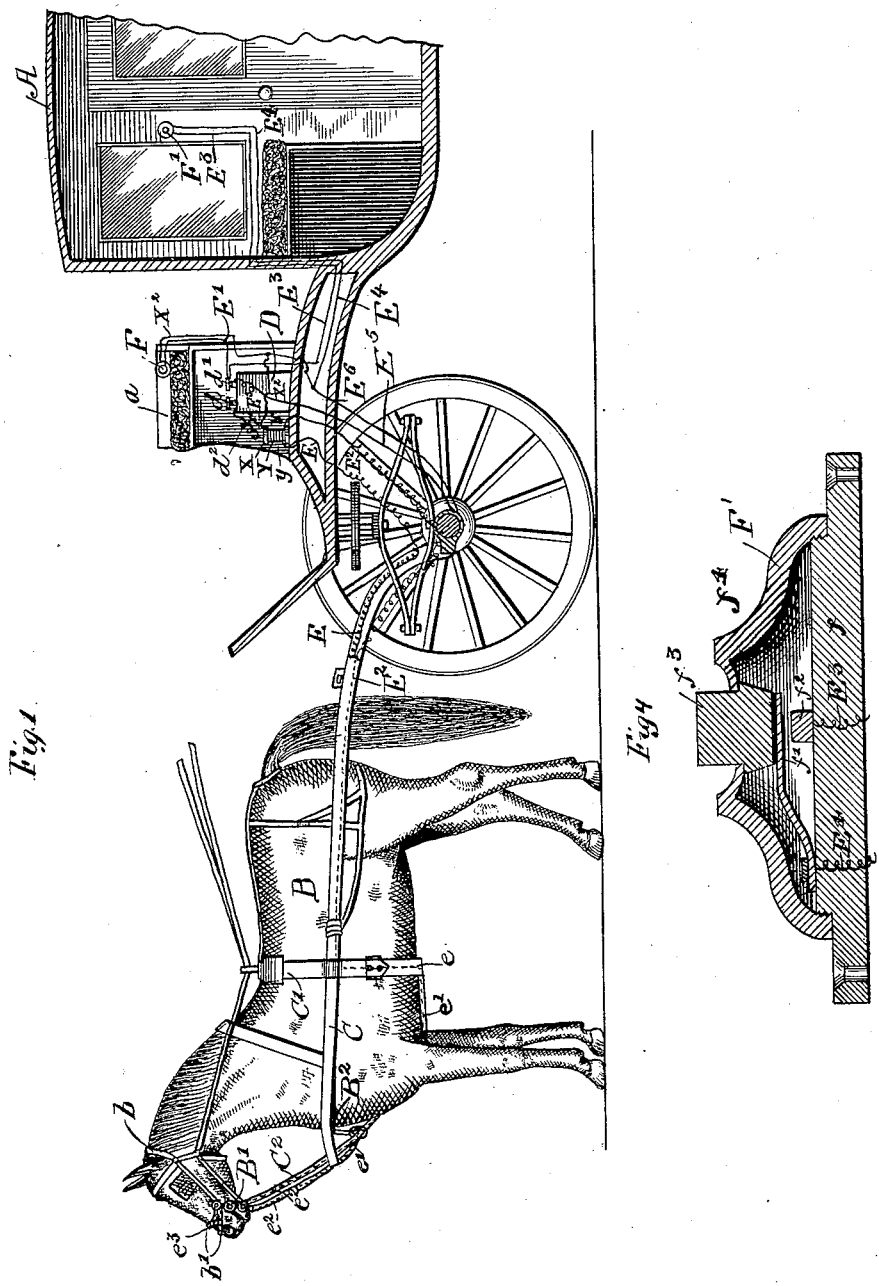

(No Model.) 3 Sheets—Sheet 1.
A. B. HOLSON.
ELECTRICAL DEVICE FOR STOPPING HORSES.
No. 470,155. Patented Mar. 1, 1892.

Witnesses
Lutz S. Alter
Flora L. Brown.

Inventor
Albert B. Holson
By Charles J. Brown,
Atty.

(No Model.) 3 Sheets—Sheet 2.

A. B. HOLSON.
ELECTRICAL DEVICE FOR STOPPING HORSES.

No. 470,155. Patented Mar. 1, 1892.

Witnesses
Lute S. Alter
Flora L. Brown.

Inventor
Albert B. Holson
By Charles J. Brown,
Atty.

(No Model.) 3 Sheets—Sheet 3.
A. B. HOLSON.
ELECTRICAL DEVICE FOR STOPPING HORSES.
No. 470,155. Patented Mar. 1, 1892.
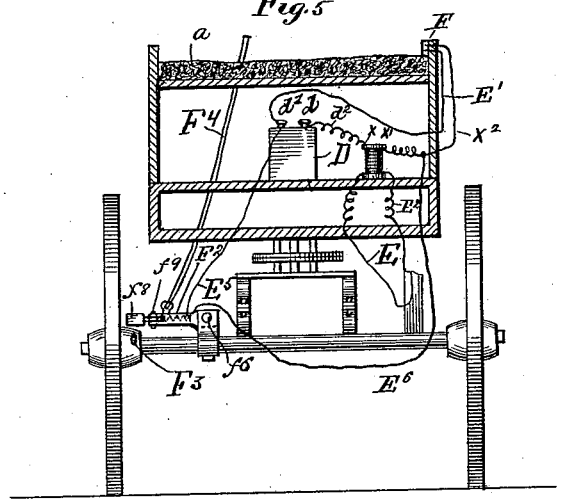
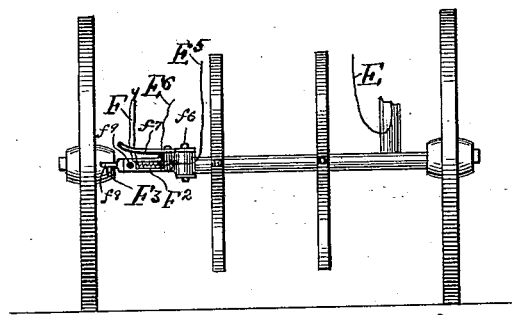
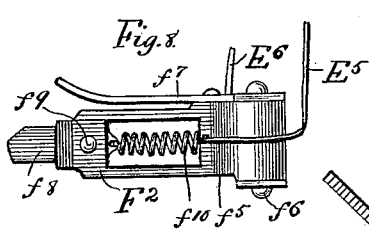
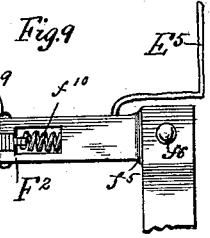
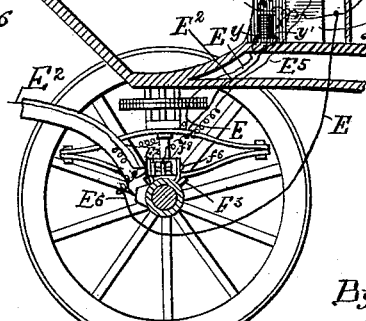
Witnesses:
Lute S. Alter
Flora L. Brown
Inventor:
Albert B. Holson
By Charles T. Brown,
Atty.

UNITED STATES PATENT OFFICE.

ALBERT B. HOLSON, OF CHICAGO, ILLINOIS, ASSIGNOR, BY DIRECT AND MESNE ASSIGNMENTS, TO THE HOLSON ELECTRIC HARNESS AND SUPPLY COMPANY, OF ILLINOIS.

ELECTRICAL DEVICE FOR STOPPING HORSES.

SPECIFICATION forming part of Letters Patent No. 470,155, dated March 1, 1892.

Application filed February 14, 1891. Serial No. 381,475. (No model.)

*To all whom it may concern:*

Be it known that I, ALBERT B. HOLSON, a citizen of the United States, residing at Chicago, in the county of Cook and State of Illinois, have invented certain new and useful Improvements in Electrical Devices for Stopping Runaway and other Teams, of which the following is a specification.

My invention relates to means for stopping runaway, headstrong, or fractious horses; and it consists in administering to the horse an electric shock at or through the nostrils.

The object of my invention is to obtain a device whereby an electrical shock can be administered to a horse or to the horses forming a team attached to a vehicle or otherwise by the driver of the vehicle or by the occupants thereof, where the vehicle contains other occupants than the driver, as in coaches, barouches, and the like kind of vehicles, at the will of either the driver or such occupants of the vehicle; and also to obtain a device whereby when a team hitched to a vehicle is stopped and the driver has occasion to leave his seat, a certain amount of forward movement in the team is allowable before any electrical shock will be administered to such team, but upon sufficient forward movement of the team a shock will be automatically administered thereto, and the team thereby stopped, but no shock will be administered in any backward movement of the team.

This device, so far as it relates to the automatic administering of an electric shock in the absence of a driver or other person in charge of a team when such team has gone a certain distance in a forward direction may be termed an "electrical hitching-post;" but the action of the device, except that the electrical shock possible thereby is automatically administered by the movement of the team instead of by the action of the driver or occupant of the vehicle, is the same. I have found in practice that electrical shocks administered upon different parts or portions of a horse's body have very different effects, and that in order to insure the stopping of a horse by an electrical shock it is necessary to administer such shock at or in the nostrils.

The manner in which an electric shock is by my device administered to a horse or to a team of horses, either at the will of the driver or other occupant of the vehicle or automatically by the movement of the vehicle, is illustrated in the drawings accompanying and forming a part of this specification, in which—

Figure 2:
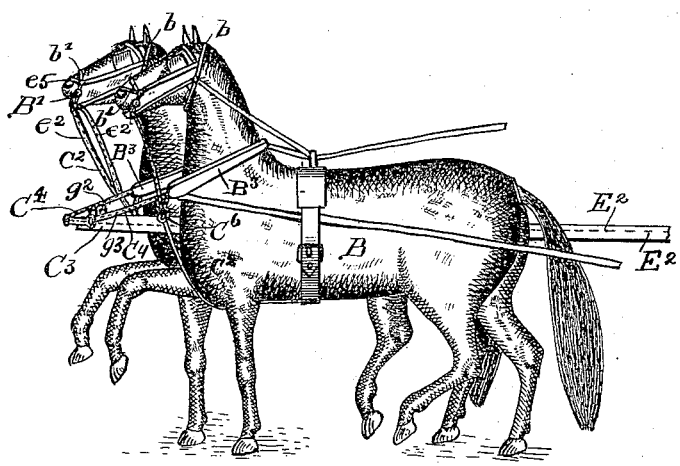
Figure 3:
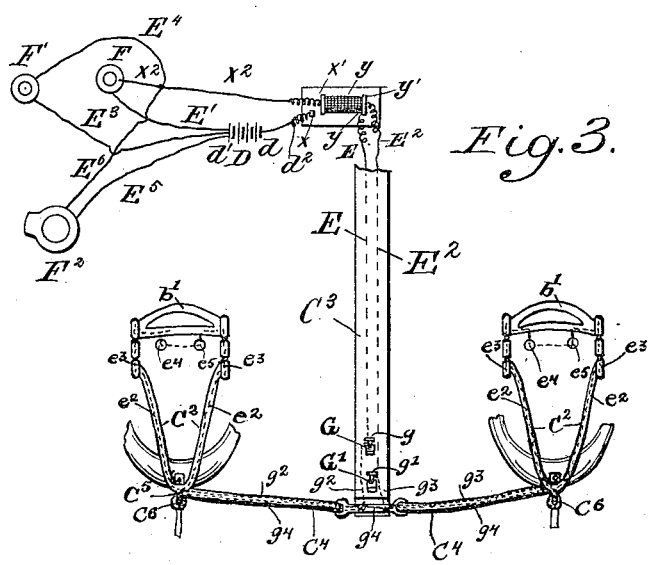

Figure 1 is a side elevation of a horse hitched in the shafts of a carriage, and a sectional view of such carriage with the devices attached to such horse and carriage. Fig. 2 is a side elevation of a pair of horses hitched to the pole of a vehicle with the device attached to such pole and to the harness of the horses. Fig. 3 is a diagrammatic view of a battery, induction-coil, and a part of the pole of a vehicle, and showing, also, conductors including circuit-closers, the battery, and coil, and several parts of the harness to the point of application of the shock. Fig. 4 is a push-button circuit-closer adapted to be placed upon the driver's seat and upon the inside of the vehicle. Fig. 5 is a rear view of the front part of a vehicle, showing the manner in which a device forming an automatic circuit-closer is attached to a vehicle in order that a shock may be automatically administered, when desired, by the forward movement of the team hitched to the vehicle. Fig. 6 is a top plan view of the axle and wheels of a vehicle with an automatic circuit-closer attached to one end of the axle. Fig. 7 is a sectional view of a vehicle with an automatic circuit-closer thereon; Fig. 8, a top plan view of an automatic circuit-closer on an enlarged scale, forming an element in the invention; and Fig. 9 a side elevation thereof.

Similar letters of reference refer to the same parts where more than one view is shown.

In order to render the detailed description of the several parts of the device easily understood, I will here briefly state that in the preferred form of application of this invention I connect the terminals of an ordinary primary or secondary battery through one or more circuit-closers to the terminals of the primary coil of an induction-coil and I connect the terminals of the secondary coil of an induction-coil either directly or through one or more circuit-closers to two contact-points contained at or in the nostrils of the animal. This preferred form of construction is shown in Fig. 3; but the induction-coil is not shown in all of the figures. When both primary and secondary circuits are closed by the driver or by the occupants of the vehicle, or automatically by the forward movement of the wheels, or by any other means, the induced current passes through the nostrils of the animal, administering an electric shock at that point. In order that no injury shall be done to the horse and that the electrical contact-points referred to as placed at or in its nostrils shall not irritate the horse, I have employed for such electrical contact-points small metal globes; but other materials—such as carbon—may be employed, and the contacts may be of other form than globular.

A is a vehicle, and $a$ is the seat thereof.

B is a horse.

B' B' are the bits.

$B^2$ is the breast-strap of the harness of a horse.

$B^3$ is a horse's collar.

$b$ is a bridle.

$b'$ is a nose band or strap extending from the bridle over or upon the nose of the horse.

C is a shaft of a vehicle.

C' is a belly-band extending from the saddle of the harness.

$C^2$ is a martingale extending from the belly-band C' to the bridle $b$.

$C^3$ is the pole of a vehicle, to which two horses are to be attached abreast, and which pole serves as a draft attachment the same as do the shafts between which a single horse is to be attached to a vehicle.

$C^4$ $C^4$ are pole-straps extending from the pole $C^3$ of the vehicle to the collars $B^3$ $B^3$.

$C^5$ $C^5$ are the straps extending from the collar $B^3$ to the martingale-rings $C^6$, through which the martingales $C^2$ $C^2$ pass.

D is an ordinary primary or secondary battery adapted to generate an electrical current. $d$ $d'$ are the poles thereof. The poles $d$ $d'$ are connected through one or more circuit-closers to the terminals $x$ $x'$ of the primary (coarse wire) coil of an induction-coil Y. The current giving the shock is generated in the secondary (fine wire) coil of this induction-coil, the terminals of which are lettered $y$ $y'$.

E is a wire extending from terminal $y$ of the induction-coil to one of the shafts of the vehicle and along such shaft.

$E^2$ is a wire extending from terminal $y'$ of the induction-coil to the other shaft of the vehicle and along such shaft. Where a pole is used on a vehicle, as in Figs. 2 and 3, the wires E $E^2$ both extend along such pole.

$d^2$ is a wire extending from battery-terminal $d$ to the induction-coil terminal $x$ through the interrupter of such coil.

E' is a wire extending from the terminal $d'$ of the battery to a circuit-closer on the seat of the vehicle.

$X^2$ is a wire extending from such circuit-closer to the other terminal X' of the induction-coil.

$E^3$ is a wire extending from terminal $d'$ of the battery to a circuit-closer within the vehicle, and $E^4$ is a wire extending from such circuit-closer to and electrically connected with wire $X^2$, hereinbefore described.

$E^5$ is a wire extending from terminal $d'$ of the battery to an automatic electric circuit-closer secured to the axle of the vehicle.

$E^6$ is a wire extending from such automatic circuit-closer to and electrically connected with wire $X^2$.

$e$ is a wire in the girt or belly strap of the harness electrically connected with wire $E^2$ and extending to and electrically connected with one of the wires $e'$ $e'$ in the martingale $C^2$. A like wire $e$ extends from the wire E to the other wire $e'$ in the martingale $C^2$.

$e^2$ $e^2$ are wires electrically connected with wires $e^3$ $e^3$ on, but insulated from, the bit B', and extending to the balls $e^4$ $e^5$, respectively.

The martingales illustrated in Fig. 1 and the wires contained therein are arranged in the same manner as the martingales and wires contained therein illustrated in Figs. 2 and 3, and I have therefore preserved the same lettering thereto in Figs. 1, 2, and 3. When, however, the device is attached to a vehicle having a pole thereon in place of shafts, I have found it preferable to use the following-described electrical connection between the wires E and $E^2$, in such pole and the wires $e^2$ $e^2$ in the martingale. On the pole $C^3$ are placed sockets G G', having plugs $g$ $g'$, respectively. Wire E is electrically connected to socket G, and wire $E^2$ is electrically connected to socket G'. To plug $g$ there is electrically secured wire $g^2$, extending therefrom in the holdback-strap $C^4$ to and electrically connected with one of the wires $e^2$ in the martingale.

$g^3$ is a wire electrically connected with plug $g'$ and extending in the holdback-strap $C^4$ of the other horse of the two forming the team to one of the wires $e^2$ in the martingale of such horse and electrically connected therewith.

$g^4$ is a wire extending from the other of the wires $e^2$ in the martingale of the last-named horse through the holdback of such horse, and also through the holdback of the other horse to and electrically connected with the other wires $e^2$ of the martingale of such other horse.

F is a circuit-closer on the driver's seat.

F' is a circuit-closer within the vehicle.

$F^2$ is an automatic circuit-closer secured to the axle of the vehicle.

The push-buttons F F' are made alike, the construction of push-button F consisting of base $f$, having secured thereon spring $f'$, to which may be attached a wire, as $E^4$, and metal contact-point $f^2$, to which may be attached a wire, as $E^3$, and push-button $f^3$, contained in shell $f^4$ and resting on the spring $f'$, so that by pressing on such push-button spring $f'$ may be brought into electrical contact with metal point $f^2$. The electric circuit-closer $F^2$, which is closed by pin $F^3$ on the hub of the wheel of the vehicle, in the forward movement of such wheel administers when closed a shock to the animal hitched to the vehicle in substantially the same manner the shock is administered to such animal when push-button F F' is properly closed, and such circuit-closer $F^2$ is constructed of the following parts: Pivoted lever $f^5$, of non-conducting material—as wood or hard rubber—turning on pivot $f^6$, spring $f^7$, secured to lever $f^5$, pivoted metal arm $f^8$, turning on pivot $f^9$ in lever $f^5$, and spring $f^{10}$, secured at one end to pivoted arm $f^8$ and at the other end to lever $f^5$. Wire $E^5$ is electrically connected with the spring $f^{10}$ and thus to lever $f^8$, and wire $E^6$ is electrically connected to spring $f^7$.

$F^4$ is a string or strap secured to electrical circuit-breaker $F^2$, and extending therefrom to some place where it can be reached conveniently by the driver when on the seat or about to leave it. The purpose of the strap or cord $F^4$ is to enable the driver to raise the circuit-breaker $F^2$ so that the arm $f^8$ thereon shall not come in contact with the pin $F^3$ on the hub of the wheel of the vehicle, and this strap $F^4$ is not essentially a part of the circuit-closer $F^2$, as lever $F^5$ thereof may be thrown back upon pivot $f^6$ by the driver or other person in charge of the vehicle after he has dismounted from the seat $a$ of the vehicle and strap $F^4$ thereby dispensed with, if preferred. The operation of this circuit-closer $F^2$ is, when the pin $F^3$ on the hub of the wheel of the vehicle comes in contact with arm $f^8$ of the circuit-closer in the moving forward of the vehicle, the arm $f^8$ is forced around to the right or in the direction in which the hands of the clock move on pivot $f^9$ and into electrical contact with spring $f^7$, thereby closing the circuit in which the circuit-closer is placed, and when the electrical contact-points $e^4 e^5$ are placed in the nostrils of a horse and forming an element in the secondary circuit, the primary circuit being closed in the manner described by the circuit-closer $F^2$ the horse will form an element in such secondary circuit, and will thereby receive a shock from the electric contact-points contained in his nostrils. When the team is backed, however, the pin $F^3$, coming in contact with the arm $f^8$ on the same side thereof that spring $f^6$ is placed, such arm $f^8$ is turned to the left or away from such spring, and the pin $F^3$ may and will pass by the arm $f^8$, turning it upon its pivot $f^9$ without bringing such arm into electrical contact with the spring $f^6$, and the circuit will not be closed. The spring $f^{10}$ tends at all times to maintain the arm $f^8$ in the position illustrated in Fig. 8. It is evident that in case of a sudden jump or starting forward of the team the pin $F^3$ may pass by the arm $f^8$, first having closed the circuit by bringing such arm into electrical contact with spring $f^7$ without injury to the circuit-closer, but administering an electrical shock to the horse in the manner described.

The operation of the device when attached to a vehicle adapted to have a single horse hitched thereto in the shafts thereof is as follows: When the circuits through the primary and secondary coils of the induction-coil are closed, the battery-current flowing intermittently through the primary coil generates a current in the secondary coil. The circuit of the current thus generated consists of the wires $E^2$ $e$ $e'$ $e^2$ $e^3$, electric contact-point $e^4$, electric contact-point $e^5$, and the other of the wires $e^3$, $e^2$, $e'$, $e$, and wire E, the wires $E^2$ and E being attached to the terminals of the secondary coil of the induction-coil. By the passage of the current from contact-point $e^4$ to contact-point $e^5$ the electrical shock is administered to the horse in the manner described. When push-button F' is closed, an electric circuit is established extending from pole $d'$ of the battery D through the induction-coil to the other pole $d$ of such battery, consisting of wires $E^3$, $E^4$, $X^2$, and $d^2$, and from the secondary terminals $y$ $y'$, as in the circuit last above described. When the circuit-closer $F^2$ is thrown into position by pin $F^3$ on the hub of the wheel of the vehicle, so that arm $f^8$ thereof is in electric contact with spring $f^7$ thereof an electric circuit is formed extending from pole $d'$ of the battery D to pole $d$ thereof consisting of wire $E^5$, circuit-closer $F^2$, and wires $E^6$, $X^2$, and $d^2$, and from the terminal $y$ of the secondary coil, as in the hereinbefore-described circuit to the other terminal $y$.

When the device is attached to a vehicle having a pole for hitching two horses thereto, the closing of either of the push-buttons F F' or of the circuit-closer $F^2$, as last described, will close in the manner stated, the several circuits or parts of circuits in which such push-buttons or either of them or such circuit-closers are placed as an element, and the induced electric current, will extend on wire E in pole $C^3$, (see Figs. 2 and 3,) through socket G, plug $g$, wires $g^2$ $e^2$ $e^3$, contact-point $e^5$, the nostrils of the horse, contact-point $e^4$, wires $e^3$ $g^4$ $e^2$ $e^3$, contact-point $e^5$, through the nostrils of the other horse, contact-point $e^4$, wires $e^3$, $e^2$, and $g^3$ to plug $g'$, socket G', and from thence on wire $E^2$ to the other terminal of the secondary coil, as described.

It is evident that if a person riding on the back of a horse or a person walking on the ground were to act as a vehicle carrying the battery D and one of the circuit-closers, or if such battery and circuit-closer should be attached to the saddle or other part of the harness or fastened to the horse in any manner with the wires suitably attached thereto and to the belly-band of the harness, an electric shock could be administered by such person in the same manner as where the apparatus is carried in a vehicle, as described; but other circuit-closers and the automatic circuit-closer would not be required.

I do not limit my invention to the details of construction above described, as the structural features may be varied with wide limits without departing from the spirit of my invention—as, for example, the wires may be passed through any convenient parts of the harness (the lines being convenient) or may be supported from or upon the pole or shafts or from the harness or trappings of the horse. The form of the circuit-closers described is not an essential part of the invention; but they may be one of a number of well-known types, such as push-buttons, lever-switches, snap-switches, &c. It is also feasible, if considered desirable, to make the circuit-closers double, so that both primary and secondary circuits may be opened or closed by a single movement.

I claim—

1. In an electric device for stopping horses, a normally-open electric circuit including a source of electricity, contact-points adapted to be placed within the nostrils, and a circuit-closer whereby an electric shock may be administered to the horse at or through the nostrils, substantially as described.

2. In an electric device for stopping a horse, a normally-open electrical circuit including a source of electricity, contact-points adapted to be placed in the nostrils of the horse, and a circuit-closer placed on the vehicle within reach of the driver, substantially as described.

3. In an electric device for stopping a horse, a normally-open electrical circuit including a source of electricity, contact-points adapted to be placed within the nostrils of the horse, a circuit-closer on the vehicle within reach of the driver, and a second circuit-closer on the vehicle within reach of the occupants thereof other than the driver, whereby the circuit may be closed either by the driver or the other occupants of the vehicle and an electric shock administered to the horse at or through its nostrils, substantially as described.

4. In an electrical device for automatically stopping a horse by the movement of the vehicle, an electrical circuit including a source of electricity, contact-points adapted to be placed in the nostrils of the horse, and a circuit-closer adapted to be actuated by the movement of the vehicle, whereby to administer an electric shock to the animal at or through the nostrils, substantially as described.

5. In an electrical device for stopping horses, a primary electrical circuit including a source of electricity and an induction-coil, and a secondary electrical circuit including the induction-coil, and contacts adapted to be placed in the nostrils of the horse, and one or more circuit-closers in each of said circuits whereby said circuits may be closed and an electrical shock administered to the horse at or through the nostrils, substantially as described.

6. In an electrical device for stopping a horse or horses attached to a vehicle, an electrical circuit including a source of electricity, and a circuit-closer on the vehicle, conductors carried by the draft-pole or shafts of the vehicle, and contact-points adapted to be placed in the nostrils of the horse or horses, substantially as described.

ALBERT B. HOLSON.

Witnesses:
FLORA L. BROWN,
LUTE S. ALTER.